(12) United States Patent
Shu

(10) Patent No.: US 8,209,055 B2
(45) Date of Patent: Jun. 26, 2012

(54) SYSTEM FOR SENSING STATE AND POSITION OF ROBOT

(75) Inventor: Wen Shu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 596 days.

(21) Appl. No.: 12/399,910

(22) Filed: Mar. 6, 2009

(65) Prior Publication Data

US 2010/0076639 A1 Mar. 25, 2010

(30) Foreign Application Priority Data

Sep. 22, 2008 (CN) .......................... 2008 1 0304600

(51) Int. Cl.
*G05B 15/00* (2006.01)
(52) U.S. Cl. ........ 700/258; 700/248; 700/249; 700/252; 700/264; 701/23; 901/9; 901/30; 901/31; 901/47; 901/38

(58) Field of Classification Search .......... 700/248–249, 700/258, 264; 356/601, 623, 237; 901/1, 901/2, 8–9, 17, 30–32, 38, 35, 41, 44–47; 701/23

See application file for complete search history.

(56) References Cited

U.S. PATENT DOCUMENTS

| | | | |
|---|---|---|---|
| 6,243,657 B1 * | 6/2001 | Tuck et al. | 702/150 |
| 6,374,157 B1 * | 4/2002 | Takamura | 700/245 |
| 7,535,456 B2 * | 5/2009 | Liberty et al. | 345/158 |
| 2006/0106495 A1 * | 5/2006 | Takenaka et al. | 700/253 |

* cited by examiner

*Primary Examiner* — Thomas Black
*Assistant Examiner* — Luke Huynh
(74) *Attorney, Agent, or Firm* — Altis Law Group, Inc.

(57) ABSTRACT

An exemplary system for sensing the state and position of a robot is provided. The system measures the acceleration and angular velocity of the robot and calculates a velocity, and a displacement of the robot. The state of the robot according to the acceleration and the velocity vector, of the robot, is determined. The system includes an alarm that activates according to the state of the robot. The system also compensates for any inaccuracy of the measured displacements.

19 Claims, 4 Drawing Sheets

SYSTEM FOR SENSING STATE AND POSITION OF ROBOT

BACKGROUND

1. Technical Field

The present disclosure relates to a sensing system and, more particularly, to a system for sensing state and position of a robot which is traveling along a predetermined path.

2. Description of Related Art

Nowadays, robots are widely used to perform repetitious or dangerous tasks. In order to control the robot, the state and position of the robot should be known as accurately as possible at any given time.

Generally, the robot can calculate its present position by using an absolute or relative coordinate system. Using one or the other of the above coordinate system the robot can calculate the traveled distance and the angular displacement from a reference point.

As an example of the use of an absolute coordinate system, the robot uses a global positioning system (GPS) to obtain its present position and calculates the path of next movement according to the comparison between the coordinates of the present position and the coordinates of the subsequent position. However, when a robot using GPS is indoors or in areas exposed to strong electromagnetic interference, the signals from the GPS satellites may be compromised and hence the robot spatial movements may not be precise.

A robot using a relative coordinate system comprises a distance detection sensor for detecting a traveling distance and an angle sensor for detecting rotation angle of the robot. In general, an encoder, which can detect revolutions of a traveling wheel, is widely used as the distance detection sensor, and a gyro sensor, which can detect relative angle, is widely used as the angle sensor. However, gyros have an error rate of approximately 5~10% (percent) of measured angle. The errors may vary depending on temperature and humidity. The errors can be accumulative such that a robot cannot follow a predetermined path.

What is needed, therefore, is a system which can overcome the above-mentioned problems.

BRIEF DESCRIPTION OF THE DRAWINGS

The detail of the present system, both as to its structure and operation, can best be understood by referring to the accompanying drawings, in which like reference numbers and designations refer to like elements.

DETAILED DESCRIPTION OF THE EMBODIMENTS

Embodiments of the invention will now be described in detail below and with reference to the drawings.

An absolute coordinate system is established with the starting point of the robot as the origin of the Cartesian coordinates and with the x, y, and z axes as the coordinate axes. A relative coordinate system, with the center of gravity of the robot as the origin, and the x', y', and z' axes as the coordinate axes is established. Before the robot moves, the relative coordinate system coincides with the absolute coordinate system. During movement of the robot, the relative coordinate system changes along with the movement of the robot.

Figure 1:
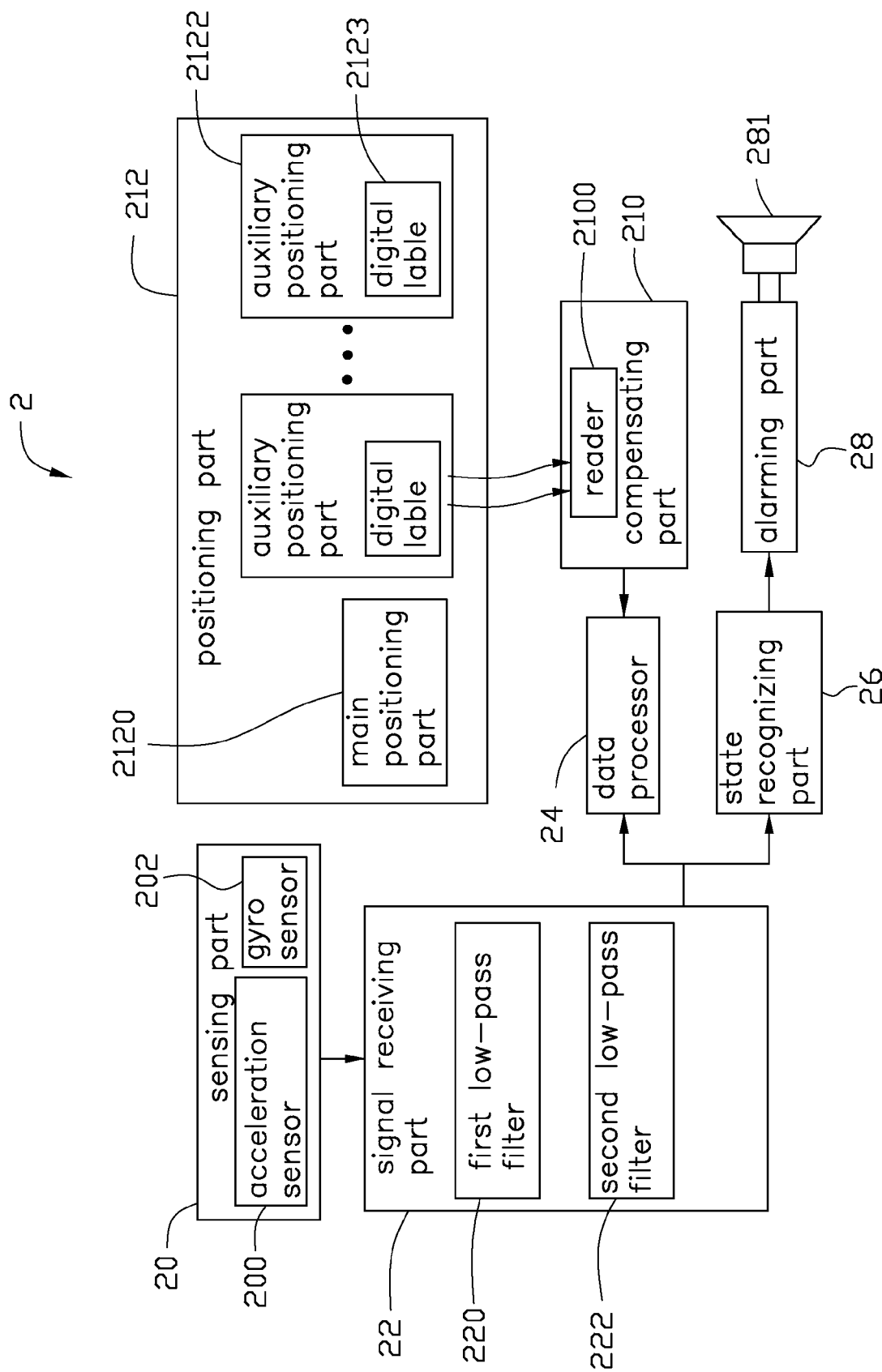
FIG. 1 is an exemplary block diagram of the system for sensing a state and position of a robot.

Referring to FIG. 1, the sensing system 2 includes a sensing part 20, a signal receiving part 22, a data processor 24, a state recognizing part 26, an alarming part 28, a compensating part 210, and a number of positioning parts 212 which are set along the predetermined path of the robot at equal intervals.

The sensing part 20 includes an acceleration sensor 200 for measuring the acceleration of the robot, and a gyro sensor 202 for measuring angular velocity of the robot.

Figure 2:
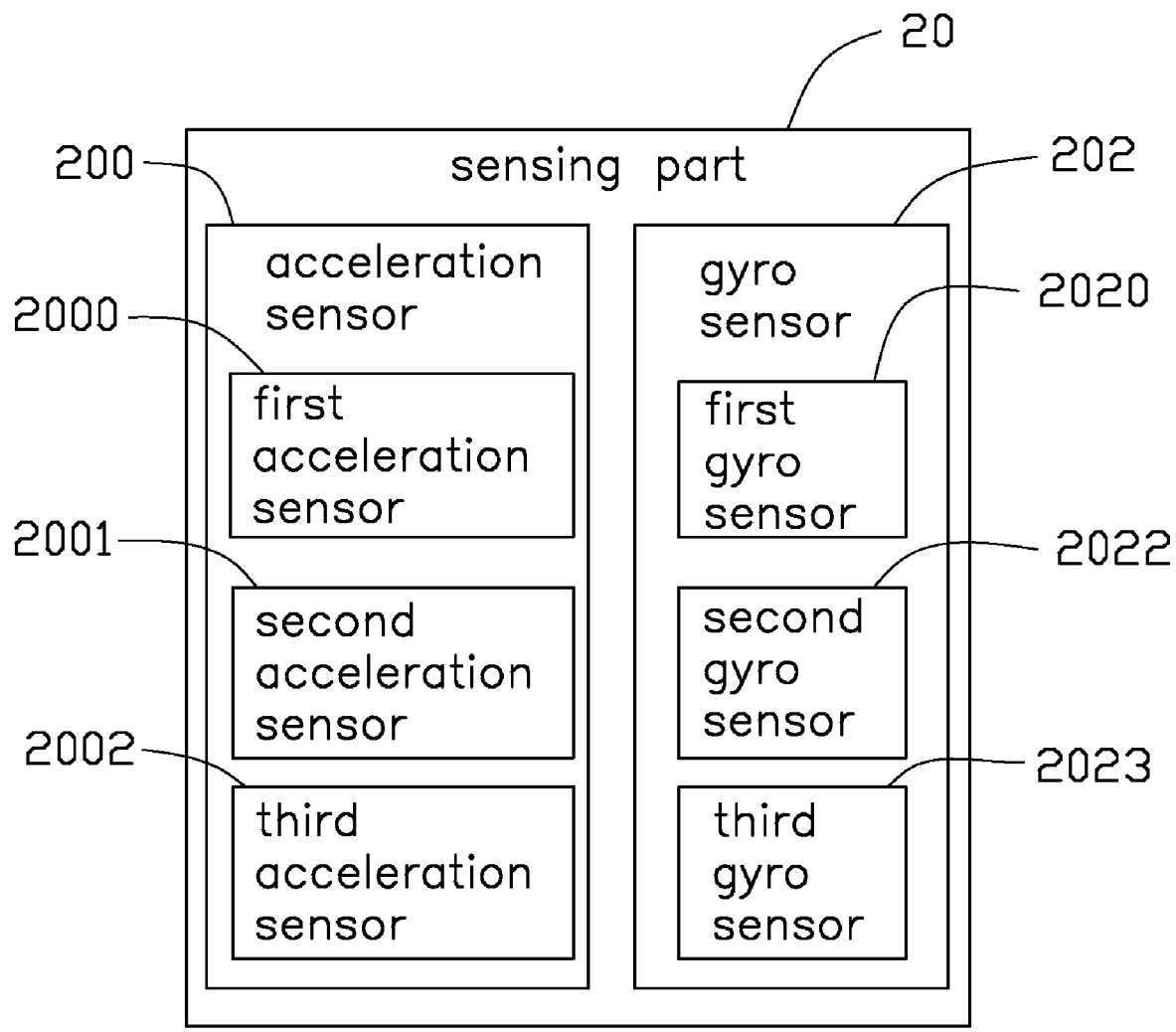
FIG. 2 is an exemplary block diagram of a sensing part shown in FIG. 1.

An exemplary block diagram of sensing part 20 is shown in FIG. 2. The acceleration sensor 200 includes a first acceleration sensor 2000 for measuring acceleration along the x' axis, a second acceleration sensor 2001 for measuring acceleration along the y' axis, and a third acceleration sensor 2002 for measuring acceleration along the z' axis. The x' axis, the y' axis, and the z' axis are orthogonal to each other.

The gyro sensor 202 also includes a first gyro sensor 2020 for measuring the angular velocity along the x axis, a second gyro sensor 2022 for measuring the angular velocity along the y axis, and a third gyro sensor 2023 for measuring the angular velocity along the z axis.

The acceleration measured by the acceleration sensor 200 and the angular velocity measured by the gyro sensor 202 are components of the relative coordinate system.

The signal receiving part 22 includes a first low-pass filter 220 which passes signals having frequencies at or less than 12.5 hertz (Hz), and a second low-pass filter 222 which passes signals having frequencies at or less than 50 Hz.

The first low-pass filter 220 is configured for filtering out high frequency distortion of the acceleration measured by the acceleration sensor 200 and transferring the filtered acceleration to the data processor 24.

The second low-pass filter 222 is configured for filtering out high frequency distortion of the angular velocity measured by the gyro sensor 202 and transferring the filtered angular velocity to the data processor 24.

The data processor 24 calculates the acceleration vector $\alpha$ of the robot and the angular velocity vector $\psi$ of the robot according to the acceleration and angular velocity transferred from the signal receiving part 22. The acceleration vector $\alpha$ of the robot and the angular velocity vector $\psi$ of the robot are both with respect to the relative coordinate system. The acceleration vector $\alpha$ can be represented as an absolute acceleration value $|\alpha|$ and the acceleration direction with respect to the relative coordinate system. The angular velocity vector $\psi$ can be represented as an absolute acceleration value $|\psi|$ and the angular velocity direction with respect to the relative coordinate system.

In order to calculate out the acceleration vector $\alpha_o$ of the robot and the angular velocity vector $\psi_o$ of the robot with respect to the absolute coordinate system, the rotation matrix C between the relative coordinate system and the absolute coordinate should be calculated by the data processor 24.

The rotation matrix C can be acquired by the integral operation and matrix multiplication. It's assumed that the absolute coordinate coincides with the relative coordinate system which represents the robot at the beginning state, and after a time interval $\Delta T$ the relative coordinate system has been rotated to a new position with different coordinates relative to the absolute coordinate system. The rotational angle $\alpha$ of the x axis of the relative coordinate system during the time interval $\Delta T$ can be calculated by the integral operation of the rotational angular velocity along to the x axis of the relative coordinate system. Similarly, the rotational angle $\beta$ of the y axis of the relative coordinate system and the rotational angle ω of the z axis of the relative coordinate system can be calculated. Therefore, the rotation matrix C between the absolute coordinate and the rotated relative coordinate system is represented by a formula:

$$C = \begin{bmatrix} 1 & 0 & 0 \\ 0 & \cos\alpha & -\sin\alpha \\ 0 & \sin\alpha & \cos\alpha \end{bmatrix} \begin{bmatrix} \cos\beta & 0 & \sin\beta \\ 0 & 1 & 0 \\ -\sin\beta & 0 & \cos\beta \end{bmatrix} \begin{bmatrix} \cos\omega & -\sin\omega & 0 \\ \sin\omega & \cos\omega & 0 \\ 0 & 0 & 1 \end{bmatrix}$$

After the time interval of nΔT, the rotation matrix C between the latest relative coordinate system and the absolute coordinate can be acquired by multiplying the preceding rotation matrix $C_{n-1}$ by the latest rotation matrix $C_n$.

The data processor 24 calculates the acceleration vector $\alpha_o$ of the robot with respect to the absolute coordinate system by multiplying the acceleration vector α of the robot by the rotation matrix C between the latest relative coordinate system and the absolute coordinate system. Furthermore, a velocity vector $V_o$ and a displacement vector $S_o$ of the robot can be calculated, with respect to the absolute coordinate system by the integral operation of the acceleration vector $\alpha_o$ of the robot. The acceleration vector $\alpha_o$ can be represented as an absolute acceleration value $|\alpha_o|$ and the acceleration direction with respect to the absolute coordinate. The velocity vector $V_o$ can be represented as an absolute velocity value $|V_o|$ and the velocity direction with respect to the absolute coordinate. The displacement vector $S_o$ can be represented as a displacement value $|S_o|$ and the displacement direction with respect to the Cartesian coordinate. The data processor 24 transfers the velocity vector $V_o$ of the robot with respect to the absolute coordinate system and the acceleration vector $\alpha_o$ of the robot with respect to the absolute coordinate system to the state recognizing part 26.

Figure 3:
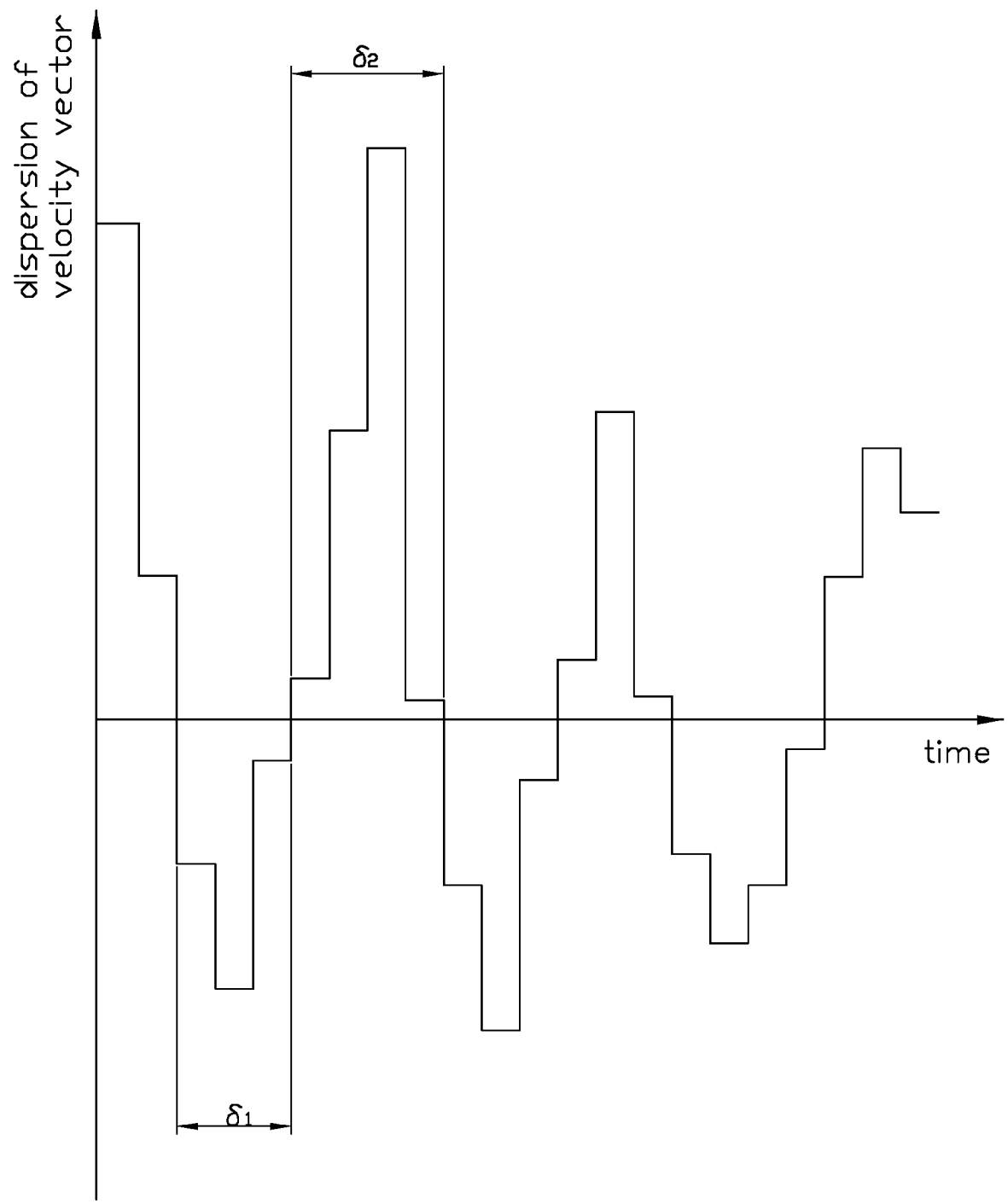
FIG. 3 is an exemplary graph of velocity dispersion data of a jolted robot.

The state recognizing part 26 is configured for recognizing the states of robot. The state of robot recognized by the state recognizing part 26 is a state of being jolted and a state of being tilted. The state recognizing part 26 recognizes whether the robot is jolted or not by use of the analysis about the dispersion data of the velocity vector $V_o$. Referring to FIG. 3, an exemplary graph of velocity dispersion data of a jolted robot is shown. The dispersion data has such a character that its direction changes frequently. Therefore, the state recognizing part 26 presets a threshold time δ and a threshold frequency T. When the data representing the velocity vector with different direction has a lasting time less than the threshold time δ continuously appears, the state recognizing part 26 regards that a jolted period has occurred. For example, in FIG. 3, the positive data and the negative data represent opposite directions of the velocity vector $V_o$. The lasting time $\delta_1$ of the negative data and the lasting time $\delta_2$ of the positive data are both less than the threshold time δ, and the positive data and the negative data continuously appear. Therefore, the state recognizing part 26 regards that a jolted period has occurred. When the frequency of the jolted period is more than the threshold frequency T, the state recognizing part 26 regards the robot as being jolted and transfers a jolted alarming instruction to the alarming part 28.

The state recognizing part 26 recognizes whether the robot is tilted or not by use of the analysis about the direction angle of the acceleration vector $\alpha_o$ with respect to the absolute coordinate system. The state recognizing part 26 presets a first direction angle range $(\theta_1, \theta_2)$ with respect to the x axis of the absolute coordinate system, a second direction angle range $(\phi_1, \phi_2)$ with respect to the y axis of the absolute coordinate system, and a third direction angle range $(\gamma_1, \gamma_2)$ with respect to the z axis of the absolute coordinate system. If the direction angle of the acceleration vector $\alpha_o$ with respect to the absolute coordinate system doesn't fall into the angle range collaborative defined by the first direction angle range $(\theta_1, \theta_2)$, second direction angle range $(74_1, \theta_2)$, and the third direction angle range $(\gamma_1, \gamma_2)$, the state recognizing part 26 regards the robot is tilted and transfers a tilted alarming instruction to the alarming part 28.

The alarming part 28 includes an alarm 281, which may be a device for giving an audible, visible, or other alarm. If the alarming part 28 receives a jolted alarming instruction, the alarm 281 will activate a jolted alarm. If the alarming part 28 receives a tilted alarming instruction, the alarm 281 will activate a tilted alarm. The jolted alarm and the tilted alarm can be pre-recorded in a memory, such as magnetic tape, or flash memory. The audible jolted alarm should be distinguished from the audible tilted alarm.

The displacement vector $S_o$ of the robot has errors of approximately 5 to 10% (percent). The errors occur due to a constant error based on the integral calculus of the gyro sensor 202 and a change of scale factor depending on change of inner variables such as temperature and humidity. As a result, the error has to be compensated for the robot to precisely follow the predetermined path.

Figure 4:
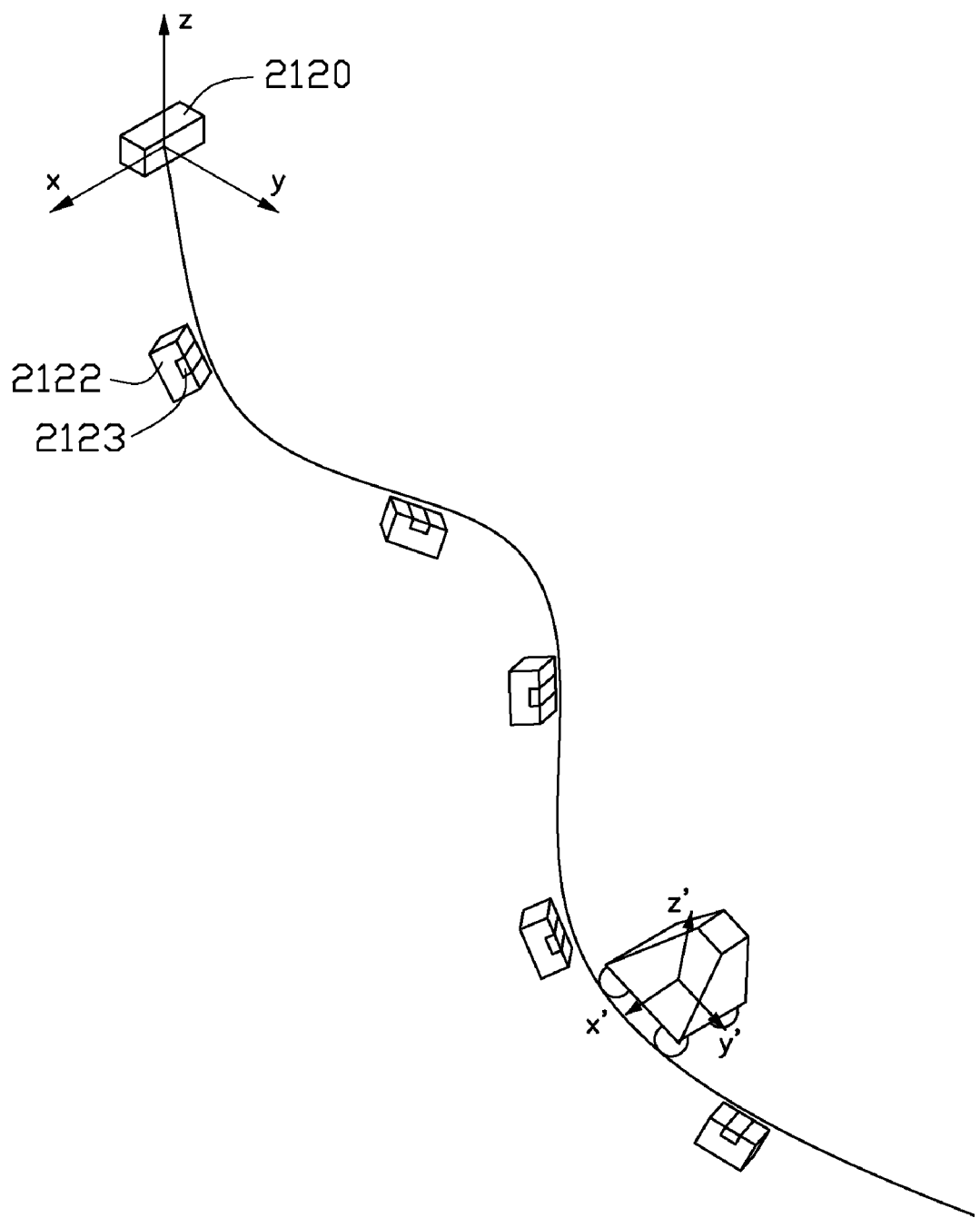
FIG. 4 is an exemplary graph of arrangement of a number of positioning parts shown in FIG. 1.

The compensating part 210 and a number of positioning parts 212 are configured for compensating the errors of the displacement vector $S_o$. The positioning parts 212 include a main positioning part 2120 and a number of auxiliary positioning parts 2122. Referring to FIG. 4, the main positioning part 2120 is set at the starting point of the robot, i.e., the original of the absolute coordinate system. The main positioning part 2120 is configured for initializing the data save in the data processor 24 when the robot is about to move. The auxiliary positioning parts 2122 are set along the predetermined path of the robot at equal intervals. Therefore, every auxiliary positioning part 2122 has determinate displacement vector S' with respect to the main positioning part 2120, i.e., the absolute coordinate system. Every auxiliary positioning part 2122 has a digital label 2123 for containing the information corresponding to the determinate displacement vector S'.

The compensating part 210 includes a reader 2100 for receiving the information contained on the digital label 2123. When the robot passes by one of the auxiliary positioning part 2122 along the predetermined path, the reader 2100 acquires the determinate displacement vector S' of the auxiliary positioning part 2122. The robot has the same location with the passed auxiliary positioning part 2122; therefore the determinate displacement vector S' of the auxiliary positioning part 2122 can be considered to be a correct displacement vector S' of the robot. The compensating part 210 acquires a compensating value ΔS from the difference between the correct displacement vector S' of the robot and the displacement vector $S_o$ calculated by the data processor 24. The compensating part 210 compensates the displacement vector $S_o$ according to the compensating value ΔS before the robot meeting the subsequent auxiliary positioning part 2122.

It's understood that the number of auxiliary positioning part 2122 is determined by the length of the travelling path and the accuracy of the gyro sensor 202. For example, in the same travelling path, more accurate the gyro sensor 202 is, the less auxiliary positioning part 2122 needed.

As describe above, the sensing system 2 can recognize the state of a robot and compensates the displacement vector $S_o$ of the robot due to a constant error based on integral calculus of output value of the gyro sensor 202. Therefore, the errors of the gyro sensor 202 are not accumulated. As a result, the travelling accuracy is improved.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A system for sensing the position of a robot, the system comprising:
   a sensing part configured for measuring an acceleration and an angular velocity of the robot;
   a data processor configured for calculating a displacement of the robot according to the acceleration and the angular velocity of the robot;
   a plurality of positioning parts set along a predetermined path of the robot at equal intervals and configured for providing location information of the positioning parts, the positioning parts comprising a main positioning part set at the starting point of the robot, wherein the main positioning part is configured for initializing data saved in the data processor when the robot is about to move; and
   a compensating part configured for compensating the displacement calculated by the data processor according to the location information of the positioning parts.

2. The system as claimed in claim 1, further comprising a signal receiving part configured for filtering out high frequency distortion of the signal measured by the sensing part.

3. The system as claimed in claim 2, wherein the signal receiving part comprises a first low-pass filter for filtering out distortion of the acceleration having a frequency higher than 12.5 hertz (Hz), and a second low-pass filter for filtering out the distortion of the angular velocity having a frequency higher than 50 Hz.

4. The system as claimed in claim 1, wherein the sensing part comprises an acceleration sensor for measuring the acceleration of the robot and a gyro sensor for measuring the angular velocity of the robot.

5. The system as claimed in claim 4, wherein the acceleration sensor comprises a first acceleration sensor for measuring the acceleration along a first axis, a second acceleration sensor for measuring the acceleration along a second axis, and a third acceleration sensor for measuring the acceleration along a third axis, the first axis, the second axis and the third axis being orthogonal to each other.

6. The system as claimed in claim 4, wherein the gyro sensor comprises a first gyro sensor for measuring the angular velocity along a first axis, a second gyro sensor for measuring the angular velocity along a second axis, and a third gyro sensor for measuring the angular velocity along a third axis, the first axis, the second axis, and the third axis being orthogonal to each other.

7. The system as claimed in claim 1, wherein the positioning parts further comprise a plurality of auxiliary positioning parts set along the predetermined path of the robot at equal intervals.

8. The system as claimed in claim 7, wherein each of the auxiliary positioning parts has a digital label for containing the information corresponding to its location.

9. The system as claimed in claim 8, wherein the compensating part comprises a reader for receiving the information contained on the digital label when the robot is passing by the auxiliary positioning parts.

10. A system for sensing one or more states of a robot, the system comprising:
    a sensing part for measuring an acceleration and an angular velocity of the robot;
    a data processor for calculating a velocity of the robot according to the acceleration and the angular velocity of the robot;
    a state recognizing part for recognizing one or more states of the robot from the velocity and the acceleration of the robot, and generating an instruction corresponding to each state of the robot recognized, the state recognizing part comprising a preset threshold time and a preset threshold frequency, wherein if the direction of the velocity continuously changes and the lasting time of each velocity value corresponding to each of the different directions is less than the threshold time, the state recognizing part regards that a jolted period has occurred, and if the frequency of a plurality of the jolted periods is more than the threshold frequency, the state recognizing part regards that the robot is jolted and generates a jolted alarming instruction; and
    an alarming part for activating an alarm according to the instruction transferred from the state recognizing part.

11. The system as claimed in claim 10, further comprising a signal receiving part for filtering out high frequency distortion of the signals measured by the sensing part.

12. The system as claimed in claim 11, wherein the signal receiving part comprising a first low-pass filter for filtering out distortion of the acceleration having a frequency more than 12.5 hertz (Hz), and a second low-pass filter for filtering out distortion of the angular velocity having a frequency more than 50 Hz.

13. The system as claimed in claim 10, wherein the sensing part comprising an acceleration sensor for measuring the acceleration of the robot and a gyro sensor for measuring the angular velocity of the robot.

14. The system as claimed in claim 13, wherein the acceleration sensor comprises a first acceleration sensor for measuring the acceleration along a first axis, a second acceleration sensor for measuring the acceleration along a second axis, and a third acceleration sensor for measuring the acceleration along a third axis, the first axis, the second axis and the third axis being orthogonal to each other.

15. The system as claimed in claim 13, wherein the gyro sensor comprises a first gyro sensor for measuring the angular velocity along a first axis, a second gyro sensor for measuring the angular velocity along a second axis, and a third gyro sensor for measuring the angular velocity along a third axis, the first axis, the second axis, and the third axis being orthogonal to each other.

16. The system as claimed in claim 10, wherein the state recognizing part further comprises a preset first direction angle range with respect to a first axis, a preset second direction angle range with respect to a second axis, and a preset third direction angle range with respect to a third axis, the first axis, the second axis and the third axis being orthogonal to each other, and if the direction angle of the acceleration of the robot does not fall into the angle range collaboratively defined by the first direction angle range, the second direction angle range, and the third direction angle range, the state recognizing part regards that the robot is tilted and generates a tilted alarming instruction.

17. A robot capable of correcting information on its position via a plurality of positioning parts set along a predetermined path of travel of the robot, the robot comprising:
    a sensing part configured for measuring an acceleration and an angular velocity of the robot;

a data processor configured for calculating a displacement of the robot according to the acceleration and the angular velocity of the robot;

a compensating part configured for compensating the displacement calculated by the data processor according to the location information of the positioning parts; and a state recognizing part for recognizing one or more states of the robot from the velocity and the acceleration of the robot, and generating an instruction corresponding to the state of the robot recognized, the state recognizing part comprising a preset threshold time and a preset threshold frequency, wherein on condition that the direction of the velocity continuously changes and the lasting time of each velocity value corresponding to each of the different directions is less than the threshold time, the state recognizing part regards that a jolted period has occurred, and on condition that the frequency of a plurality of the jolted periods is more than the threshold frequency, the state recognizing part regards that the robot is jolted and generates a jolted alarming instruction.

18. The robot as claimed in claim 17, further comprising an alarming part for activating an alarm according to the instruction transferred from the state recognizing part.

19. The robot as claimed in claim 17, wherein the state recognizing part further comprises a preset first direction angle range with respect to a first axis, a preset second direction angle range with respect to a second axis, and a preset third direction angle range with respect to a third axis, the first axis, the second axis and the third axis being orthogonal to each other, and on condition that the direction angle of the acceleration of the robot does not fall into the angle range collaboratively defined by the first direction angle range, the second direction angle range, and the third direction angle range, the state recognizing part regards that the robot is tilted and generates a tilted alarming instruction.

* * * * *